DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 1, 1974

918 O.G. 103

T918,001

FLAME RETARDANT MOLDING COMPOSITIONS HAVING DESIRABLE MECHANICAL PROPERTIES

Theodore F. Gray, Jr., 2153 Westwind Drive 37660; James C. Weaver, 1549 Garden Drive 37664; and Marvin A. McCall, 4519 Mitchell Road 37664, all of Kingsport, Tenn.

Continuation of abandoned application Ser. No. 16,953, Aug. 5, 1970. This application Feb. 1, 1971, Ser. No. 111,668

Int. Cl. C08g *51/04*

U.S. Cl. 260—40 R

No Drawing. 15 Pages Specification

A flame retarder which is a brominated diphenyl compound such as decabromodiphenyl ether or decabromodiphenyl carbonate alone or in combination with antimony trioxide is added to poly(tetramethylene terephthalate) or poly(ethylene terephthalate) and glass fiber to provide a composition moldable into a self-extinguishing article with mechanical properties, particularly impact strength, substantially the same as a nonself-extinguishing article molded from only poly(tetramethylene terephthalate) or poly(ethylene terephthalate) and glass fiber alone without a flame retarder. Articles molded from these compositions unexpectedly retain their self-extinguishing character even after prolonged exposure to an elevated temperature.